(12) United States Patent
Philips et al.

(10) Patent No.: US 8,208,500 B2
(45) Date of Patent: Jun. 26, 2012

(54) LOW-JITTER END-TO-END LATENCY CONTROL SCHEME FOR ISOCHRONOUS COMMUNICATIONS BASED ON TRANSMITTER TIMESTAMP INFORMATION

(75) Inventors: Norbert Philips, Bertem (BE); Mark Janssens, Leuven (BE); Steven Thoen, Leuven (BE)

(73) Assignee: NXP B.V., Eindhoven (NL)

( * ) Notice: Subject to any disclaimer, the term of this patent is extended or adjusted under 35 U.S.C. 154(b) by 345 days.

(21) Appl. No.: 12/649,493

(22) Filed: Dec. 30, 2009

(65) Prior Publication Data
US 2011/0158264 A1   Jun. 30, 2011

(51) Int. Cl.
*H04J 3/06* (2006.01)
(52) U.S. Cl. ........................................ 370/516
(58) Field of Classification Search .................. 370/350, 370/412–413, 464–465, 503, 504, 508–520; 375/354–360
See application file for complete search history.

(56) References Cited

U.S. PATENT DOCUMENTS

| 5,027,351 A | 6/1991 | De Prycker et al. |
| 6,870,876 B1 * | 3/2005 | Nohlgren et al. ............. 375/220 |
| 2005/0259754 A1 * | 11/2005 | Ho et al. ................... 375/240.28 |
| 2007/0008984 A1 * | 1/2007 | Philips et al. ................. 370/412 |

FOREIGN PATENT DOCUMENTS
WO   2005/013639 A2   2/2005

\* cited by examiner

*Primary Examiner* — Frank Duong

(57) ABSTRACT

A latency control mechanism for a communication system provides a known constant end-to-end delay between an audio source and one or more end node destinations, even in the case where different paths are used to reach the end nodes. A very low jitter time on the end-to-end latency is obtained, and the latency is controllable within a given range in dependence on the constraints imposed by the implementation. A block RX DPLL and latency control unit adjusts the reading moment and position from the RX buffer so that a delay between the time stamp taken at the source side by the transmitter time stamp unit, and the time stamp taken at the receiver side by receiver time stamp unit is constant and equal to a given value.

25 Claims, 5 Drawing Sheets

| CHANNEL ALLOCATION | startslot nr | CHANNEL ALLOCATION | startslot nr | CHANNEL ALLOCATION | startslot nr | CHANNEL ALLOCATION | startslot nr |
|---|---|---|---|---|---|---|---|
| 10 | 0 | 3 | 64 | 3 | 128 | 3 | 192 |
| 1 | 2 | 1 | 66 | 1 | 130 | 1 | 194 |
| 2 | 4 | 2 | 68 | 2 | 132 | 2 | 196 |
| 1 | 6 | 1 | 70 | 1 | 134 | 1 | 198 |
| 2 | 8 | 2 | 72 | 2 | 136 | 2 | 200 |
| 3 | 10 | 3 | 74 | 3 | 138 | 3 | 202 |
| 1 | 12 | 1 | 76 | 1 | 140 | 1 | 204 |
| 2 | 14 | 2 | 78 | 2 | 142 | 2 | 206 |
| 3 | 16 | 3 | 80 | 3 | 144 | 3 | 208 |
| 1 | 18 | 1 | 82 | 1 | 146 | 1 | 210 |
| 2 | 20 | 2 | 84 | 2 | 148 | 2 | 212 |
| 1 | 22 | 1 | 86 | 1 | 150 | 1 | 214 |
| 2 | 24 | 2 | 88 | 2 | 152 | 2 | 216 |
| 3 | 26 | 3 | 90 | 3 | 154 | 3 | 218 |
| 1 | 28 | 1 | 92 | 1 | 156 | 1 | 220 |
| 2 | 30 | 2 | 94 | 2 | 158 | 2 | 222 |
| 3 | 32 | 3 | 96 | 3 | 160 | 3 | 224 |
| 1 | 34 | 1 | 98 | 1 | 162 | 1 | 226 |
| 2 | 36 | 2 | 100 | 2 | 164 | 2 | 228 |
| 1 | 38 | 1 | 102 | 1 | 166 | 1 | 230 |
| 2 | 40 | 2 | 104 | 2 | 168 | 2 | 232 |
| 3 | 42 | 3 | 106 | 3 | 170 | 3 | 234 |
| 1 | 44 | 1 | 108 | 1 | 172 | 1 | 236 |
| 2 | 46 | 2 | 110 | 2 | 174 | 2 | 238 |
| 3 | 48 | 3 | 112 | 3 | 176 | 3 | 240 |
| 1 | 50 | 1 | 114 | 1 | 178 | 1 | 242 |
| 2 | 52 | 2 | 116 | 2 | 180 | 2 | 244 |
| 1 | 54 | 1 | 118 | 1 | 182 | 1 | 246 |
| 2 | 56 | 2 | 120 | 2 | 184 | 2 | 248 |
| 3 | 58 | 3 | 122 | 3 | 186 | 3 | 250 |
| 1 | 60 | 1 | 124 | 1 | 188 | 1 | 252 |
| 2 | 62 | 2 | 126 | 2 | 190 | 2 | 254 |

FIG. 4

LOW-JITTER END-TO-END LATENCY CONTROL SCHEME FOR ISOCHRONOUS COMMUNICATIONS BASED ON TRANSMITTER TIMESTAMP INFORMATION

The present invention relates to ways to control the jitter caused by different arrival times of data, due in part to different paths or different components that may introduce delay. More particularly, the present invention relates to latency control for isochronous data streams in order to reduce jitter in applications that may require paths through several intermediary nodes before reaching a final destination.

In wireless applications, particularly wireless audio applications, the management of delay between the audio signal at the input of a transmitter and the audio signal at the output of the receiver(s) is important to avoid distortion of the sound.

The delay between the audio signal at the input and the audio signal at the output should be the same for every receiving node. For example, when a stereo signal is transmitted to two stand-alone receivers, one that receives the left-hand audio and one that receives the right-hand audio, the sound direction information will be significantly distorted when the latency for both signal paths is different. In applications such as, for example, wireless hearing aids, an accurate indication of the position of the sound source is a significant parameter for consideration. In the aforementioned example, a time delay difference between the left and right audio signal should be typically less than 5 to 10 us.

Conventionally, latency control mechanisms are often comprised of a series of buffers that are used to store a certain predetermined amount of data in accordance with typical network delays so that the data provided to a receiver can come from the buffer in the event there is a delay in receiving data.

As disclosed in WO 2005/013639 by Philips et al., with a constant end-to-end delay, in the case of loudspeakers, each loudspeaker outputs roughly the same sample. In the case where one of two loudspeakers outputs a sample with a variable delay, the virtual sound source position or stereo image is no longer stable as delays of sound arrival in the human ear for sound produced by each of the loudspeakers create the virtual sound source illusion. The aforementioned WO publication proposes that the amount of buffer filling can compensate for end-to-end delays, by measuring items such as an input time measurement. An input time measuring unit yields a measurement, and a delay control unit controls the delay by controlling the data rate conversion on the basis of a filling measurement of the buffers and the input time measurement. In addition, a read time measuring component is arranged to measure a read time instant and yields a read time measurement of a first data unit in which the delay control unit is arranged to control the data rate conversion on the basis of the read time measurement.

In addition, in the case of medical implants, which include but are not limited to implanted audio stimulation devices, many of which are driven by means of an external processing unit mounted close to the head, data and audio communication between the implants and the external device(s) is established through a wireless link, e.g. based on magnetic induction. Both battery size and power consumption are important considerations, and in order to guarantee a sufficiently high battery life time, the power consumption on such devices needs to be very low. The result is that there is a low transmit range, and multiple hops may be needed to reach a given device. The number of hops for a left-hand device and a right-hand device might be different, and there could be different values of delay.

FIG. 1 shows an example of a hearing aid application in which implant IM1 is arranged in the left ear and implant IM2 is arranged in the right ear.

In a standard use case, both hearing aids for the left and right ears work independently of each other. For the left ear, processor PR1 captures sound from microphone MIC 1 and transmits this audio stream to implant IM1 via stream a1. Similarly, right ear processor PR2 captures sound from microphone MIC2 and transmits this particular audio stream to implant IM2 via stream a2. In this independent mode, audio stream a1 should have the same latency as audio stream a2.

In an enhanced use mode, the signals of microphones MIC1 and MIC2 are combined for audio beam forming that results in a better hearing experience. In this mode, additional streams a3 and a4 are needed so that each processor can combine both microphone signals and send the processed signals a1 and a2 to the respective implants. These streams are potentially transmitted via different physical layers, e.g. Magnetic Induction for a1 and a2, and RF for a3 and a4. Also, for this use case it is required that the processed signals of MIC1 and MIC2 reach implants IM1 and IM2 with the same delay.

Processor PR1 will receive the signal of MIC2 with a certain delay compared to the signal of MIC1 since it has to be transmitted by PR2 via channel a4. Therefore the signal of MIC1 has to be delayed also in order to align it with the signal of MIC2. The processed signal will be transmitted via a1 to IM1 and this introduces an additional delay. Similarly, processor PR2 receives the signal of MIC1 via a3 with a certain delay and it has to delay the signal of MIC2 before combining it with the signal of MIC 1 and sending the processed signal via a2 device IM2.

In order to avoid a distortion of the beam pattern, the end-to-end delay between all source and destination devices should be the same:

delay (IM1, MIC1)=delay (IM1, MIC2)=delay (IM2, MIC1)=delay (IM2, MIC2).

This end-to-end delay is preferably constant and controllable. It should also have a low time jitter since otherwise the audio signal at the destination side will be significantly distorted.

Accordingly, there is a need in the art for a latency control system that can be used to obtain a known constant end-to-end delay between an audio source and one or more destinations, even if different paths are used to reach the end nodes.

The present invention provides a latency control mechanism and method that provides a very low jitter time on the end-to-end latency, and renders the latency controllable within a given range, depending on the constraints imposed by the implementation. The present invention is applicable in many other applications beyond that of wireless applications, and can be used for all applications that have to communicate isochronous data streams with a controlled end-to-end latency.

According to an exemplary aspect of the present invention, an isochronous data stream is organized into frames and/or super frames with well-defined time references, which are known by all devices along the path followed by the data stream. These time references can be, e.g. defined by fixed data patterns in the frame such as the frame synch word.

According to another exemplary aspect of the present invention, if the data stream is communicated via different wireless or wired clusters, the time relation (time offset)

between the time reference at the transmitter/source side and the time reference at the receiver destination side should be known by the receiver.

In addition, according to the present invention, when the data stream enters the transmitter at the source side, a time stamp is taken at the local transmitter time reference and this time stamp information is transmitted together with the isochronous data stream.

According to another exemplary aspect of the present invention, when the data leaves the receiver at a destination side, a time stamp is taken at the local receiver time reference. This time stamp information, combined with the transmitter time stamp, received together with the data stream, and the known time offset between the receiver and the transmitter time reference, allows implementing a constant end-to-end latency control mechanism.

According to the present invention, the time stamp information is expressed as a number of audio samples. It contains an integer part, representing the number of audio samples received so far, and a fractional part, representing the fraction of the audio sample that has already entered the transmitter or left the receiver when the time stamp is taken.

The above and other aspects, features and advantages of the present invention will become more apparent from the following detailed description taken in conjunction with the accompanying drawings, in which:

FIG. 4 is a frame allocation scheme for two audio channels of 64 kbps according to the present invention.

Figure 1:
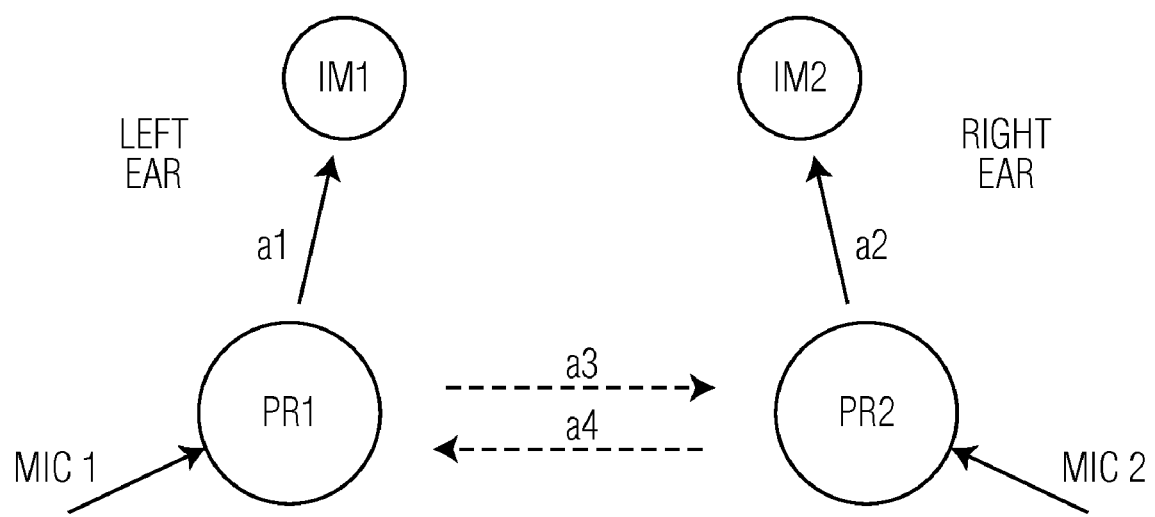
FIG. 1 illustrates a wireless hearing aid system consisting of two audio stimulation implants and two external behind-the-ear devices.
Figure 2:
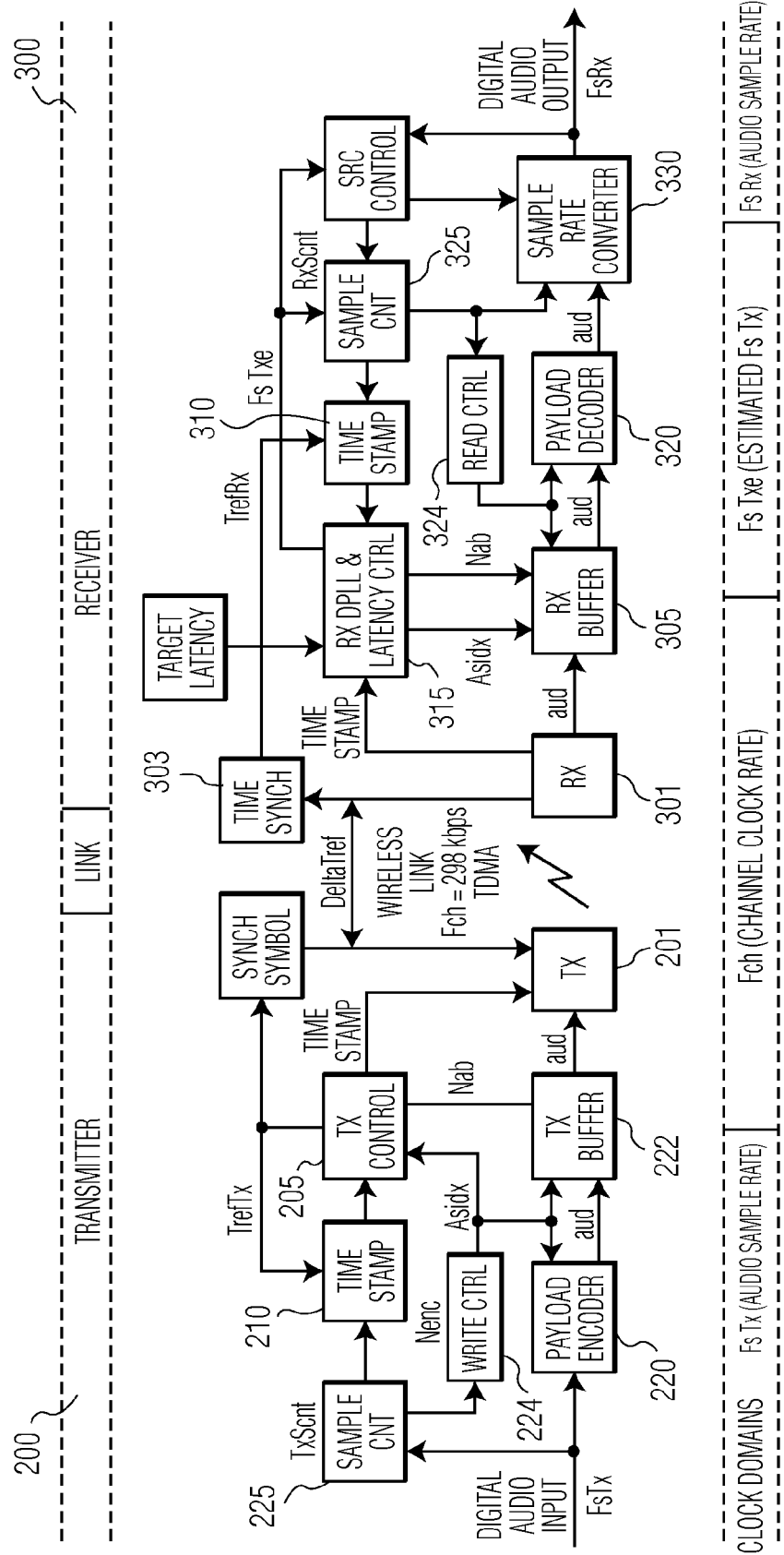
FIG. 2 is a schematic of a wireless audio system with latency control according to an exemplary embodiment of the present invention.

FIG. 2 illustrates an exemplary wireless audio system for hearing aid systems utilizing the latency control mechanism according to the present invention. A person of ordinary skill in the art should understand and appreciate that while the present invention is explained in the context of a hearing aids system, the claimed invention is clearly not limited thereto, and may apply to any type of data other than audio.

Referring now to FIG. 2, this particular wireless link is assumed to have a channel bit rate of 298 kbps, but this rate is only provided for illustrative purposes. The audio samples are transmitted by means of data frames according to, in this example, a Time Division Multiple Access (TDMA) mechanism. These data frames have a length of one or more time slots and are organized in a superframe structure, as shown, for example, in FIG. 3.

For the example shown in FIG. 2, the digital audio input applied to the transmitter is assumed to have a sample rate FsTx=16 kHz and a word size of 16 bits. In order to make efficient use of the spectrum, the digital audio stream is encoded to obtain a 4:1 bit rate reduction. It should be noted that such encoding is optional. The concept of the present invention does not depend on the method used to encode the data stream. The resulting data stream (rate=64 kbps per audio channel) has to be transmitted over the wireless channel. A typical frame and time slot allocation scheme for the example of FIG. 2 is shown in FIG. 4.

Still referring to FIG. 2, at the transmitter side 200, the incoming audio samples are counted with a high-resolution fractional sample counter, encoded by the payload encoder and written to the TX buffer. When a time slot assigned to the given audio stream becomes available at the time instant TrefTx, determined by the start time of the frame sync word, the time stamp circuit takes a snapshot TXScnt of the sample counter. This snapshot information is transmitted at the channel rate Fch=298 kbps, together with a number of (encoded) audio samples taken from the transmit (TX) buffer. The Tx control block 205 handles the transfer between both clock domains.

More particularly, the transmitter 200 includes a data sample counter 225 for counting the input data samples. Payload encoder 220 encodes input data samples into payload data. Write control unit 224 controls the storage of payload data. A transmit buffer 222 stores the payload data to be transmitted. Transmit control unit 205 generates a time reference TrefTx and a related time synchronization symbol, and the transmit control unit 205 takes a snapshot TxScnt of the transmit sample counter 225 at the aforementioned time reference. Transmit time stamp unit 210 generates a transmit time stamp information based on the value TxScnt. Transmit unit 201 for transmitting the time reference symbol, the payload data representing the input data samples, and the related time stamp information.

With continued reference to FIG. 2, at the receiver side 300, a time synchronization unit 303 detects the transmitted time reference symbol, generating a time reference TrefRx, which has a fixed and known time relationship with respect to TrefTx, and provides the time reference TrefRx to time stamp unit 310. a receive unit 301 for receiving the time reference symbol, the payload data and the related time stamp information from transmit unit 201. Receive buffer 305 stores the received payload data. The received samples are written in the receive (RX) buffer 305, at channel rate Fch=298 kbps. RX DPLL and Latency control block 315 generates an estimate FsTxe of the data sample rate FsTx at the input of the transmitter, based on the received transmitter time stamp, on the receiver time stamp generated by time stamp unit 310 and on a target latency between the transmitter timestamp and the receiver time stamp. A fractional sample counter 325 counts the number of data samples provided to the receiver output, based on the estimated sample rate FsTxe of the input data rate FsTx. Time stamp unit 310 generates a receiver time stamp by taking a snapshot RxScnt of sample counter 325 at time instant TrefRx, and providing this time stamp information to latency control block 315. Read control unit 324 controls the transfer of payload data from receive buffer 305 to a payload decoder 320 and transfers the output of payload decoder 320 to the receiver output at the rate determined by sample counter 325. Payload decoder 320 converts the payload data from receive buffer 305 to a representation of the data samples provided at the input of the transmitter.

The block RX DPLL and latency control 315 adjusts the reading moment and position from the RX buffer 305 so that the delay between the time stamp taken at the source side 200 by the transmitter time stamp unit 210, and the time stamp taken at the receiver side 300 by receiver time stamp unit 310 is constant and equal to a given value.

According to an exemplary embodiment of the present invention, based on the included time stamp information, the RX DPLL block 315 generates an estimated value FsTxe of the audio sample rate FsTx at the source side. The payload decoder 320 reads the compressed data from one RX buffer 305 and provides decoded audio samples at the estimated source sample FsTxe. The samples leaving the payload decoder 320 are counted with a high resolution fractional sample counter 325, similar to the sample counter 225 used on the transmitter side 200. This counter 325 is sampled at instant TrefRx, which has a fixed and known time relationship with respect to TrefTx, e.g. the position of the correlation peak of the frame synch word. The block RX DPLL and latency control 315 adjusts the reading from the RX buffer in such a way that the delay between the time stamp taken at the TX side 200 by the time stamp unit 210, and the time stamp taken at the RX side 300 by time stamp unit 310 is constant and equal to a given value.

In case where the audio output sample rate at the RX side 300 is imposed by the application, a sample rate converter 330 can be inserted between the payload decoder 320 and the digital audio output, as indicated at the right hand side of FIG. 2.

Figure 3:
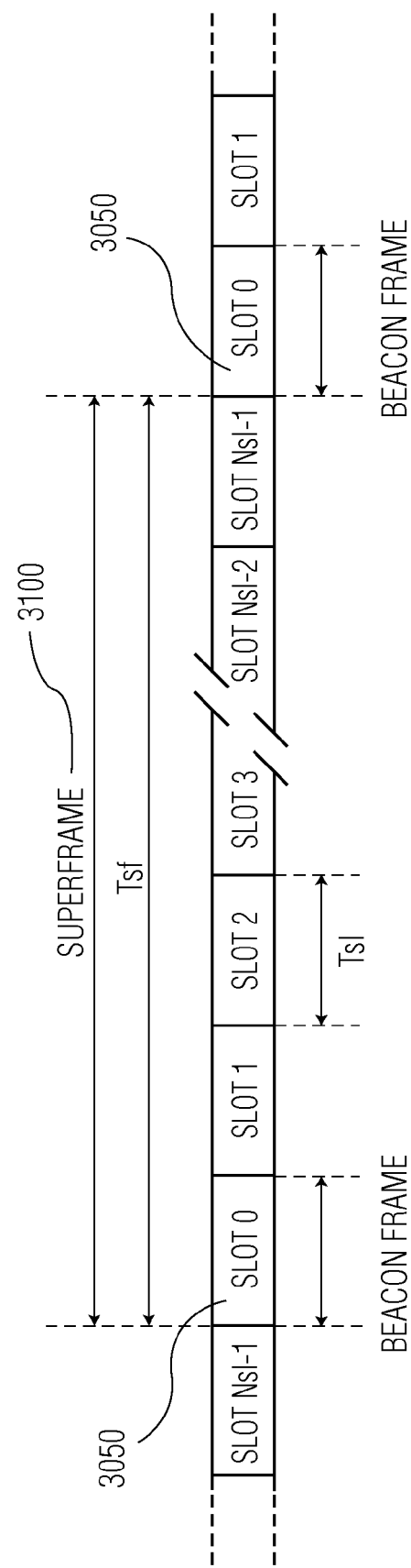
FIG. 3 is an example of a superframe structure according to the present invention.

FIG. 3 illustrates an example of a superframe structure 3100 according to the present invention. As shown in FIG. 3, the start of the superframe is indicated by a beacon frame 3050. For a given audio stream, data frames and time slots are allocated such that there is sufficient capacity to support the rate of the encoded audio stream. The distance between the different frames does not have to be constant, but the allocated time slots should be distributed as evenly as possible over the superframe in order to obtain a low end-to-end latency.

FIG. 4 shows an exemplary frame allocation scheme for two audio channels of 64 kps in this example. The audio stream parameters are an audio sample rate of 16 kHz and an encoded audio rate of 64 kbps.

In addition, the superframe parameters include a channel rate of 298 kbps, a time slot length of 322.15 us, a superframe length of 82.47 ms and 256 timeslots per superframe. With regard to channel allocation, channel 10 is the beacon channel, audio channel a1 is allocated to channel 1 and audio channel a2 is allocated to channel 2. Channel 3 is free in this example.

In operation, at the transmitter side, the sample counter 225 (FIG. 2) monitors the digital audio input and counts the number of samples received. The sample counter 225, may have, for example, a high resolution, by counting the bit clock of the serial audio interface instead of the word clock. The audio samples are sent to the payload encoder 220, which stores the encoded samples in the TX buffer 222 under the control of the write control unit 224. The write control unit 224 introduces a delay of Nenc audio samples between the digital audio input and the encoded audio data written to the TX buffer 222, representing the delay introduced by the audio encoder or by any other data processing.

At the instance TrefTx, e.g. the start of the frame synch word, a snapshot TxScnt of the TX sample counter is taken and provided to the TX control unit 205. Also, the audio sample index Asidx of the first byte to be transmitted and the number of audio bytes Nab to be transmitted are determined. If the payload encoder 220 packs two audio samples in one byte, the audio sample index Asidx increments at half the sample rate. The time stamp TxScnt will be split in different parts as indicated by the following equation:

$$TxScnt=2*(Asidx+Nab)+TimeOffset+Nenc \qquad (4.1)$$

However, if there is one audio sample in one byte, the above equation would read as TxScnt=Asidx+Nab+TimeOffset+Nenc.

The values Asidx, Nab and TimeOffset will be transmitted as time stamp information, together with the encoded audio data. The value of Nenc is assumed to be constant, and can be transmitted to the target receivers when the logical channel for the audio stream is created. With these parameters, the receiver will be able to regenerate the transmitter time stamp by using equation (4.1)

As the TDMA audio frames are asynchronous with respect to the audio input, the number of audio samples to be transmitted in the allocated time slots is variable. As a result, the TX control unit 205 also determines the number of audio bytes Nab that will be transmitted in the current audio frame. The TX control unit 205 will try to transmit all data that is present in the TX buffer 222 when the time stamp is taken. The value of TimeOffset will be zero or it will contain only the fractional part of the time stamp. When not all data present in the TX buffer can be transmitted, the integer part of TimeOffset will indicate the number of (encoded) audio samples that still needs to be transmitted.

By splitting up the timestamp TxScnt as indicated in equation (4.1), the receiver can use the audio sample index Asidx to resynchronize the write pointer to the RX buffer after a loss of one or more audio frames.

In operation, at the receiver side, a digital phased locked loop (DPLL) 315 can be used to estimate the audio sample rate (FsTxe) seen at the input of the transmitter (FsTx). In order to avoid overflow or underflow of the Rx buffer 305, the RX buffer read rate, proportional to FsTxe, should be the same as the TX buffer 222 and the RX buffer write rate, which is proportional to FsTx. By modifying FsTxe the offset between the read pointer and the write pointer in the RX buffer will be adjusted such that the target latency is obtained.

The TX control parameters Asidx and Nab are used to write the received audio data bytes in the RX buffer at a location that is synchronized with their location in the TX buffer. Parameters Asidx, Nab, TimeOffset and Nenc are used to calculate the timestamp TxScnt at a transmitter side by means of Equation (4.1).

The RX DPLL 315 generates an estimate FsTxe of the audio sample rate at the transmitter side from its local reference clock. This estimated sample rate drives the RX sample counter 325, which counts the number of samples coming out of the payload decoder 320. At time instant TrefRx, which can be determined by the correlation peak of the frame word synch, a snapshot of the sample counter RxScnt is taken. The time difference between TrefRx and TrefTx is assumed to be constant. The time difference is either known by design or can be determined when the channel for the audio stream is created, for example, by measuring the path delay. The time difference, which when expressed as a (fractional) audio sample count, is given by the following equation:

$$DeltaTref=FsTx*(TrefRx-Trx) \qquad (4.2);$$

The audio latency, expressed as a (fractional) number of audio samples, is given by the following equation:

$$Latency=TxScnt+\text{Delta Tref}-RxScnt \qquad (4.3).$$

The latency control algorithm will adjust the estimated audio sample rate FsTxe such that the latency, calculated according to equation (4.3), becomes equal to the TargetLatency for that channel.

Encoded audio bytes are read from the RX buffer under control of the read control unit and applied to the payload decoder. The decoded audio samples are made available at the sample rate FsTxe and updated synchronously with the RX sample counter. If the receiver is master of the digital audio output bus, these audio samples can be sent directly to the digital audio output. Otherwise, the sample rate first has to be converted to the required value.

Figure 5A:
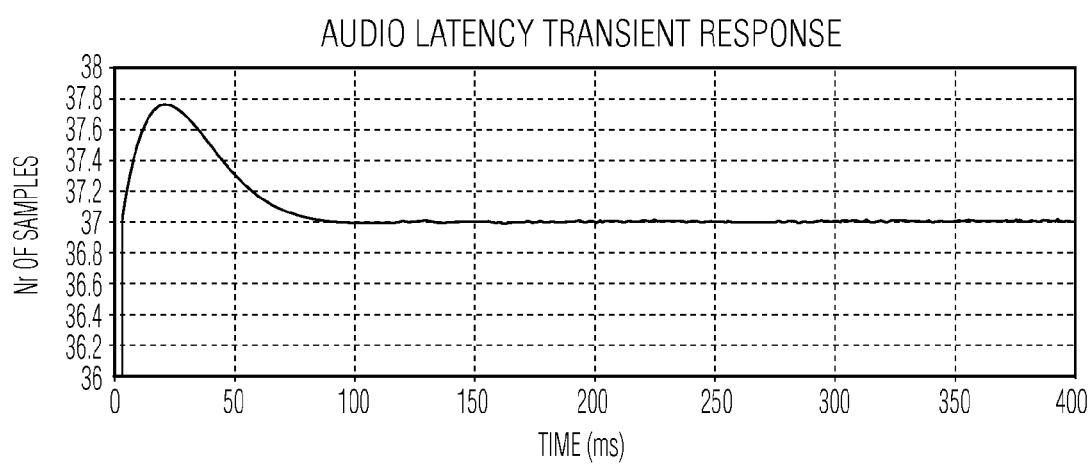
FIGS. 5A and 5B show an exemplary transient response by a latency control mechanism according to the present invention.
Figure 5B:
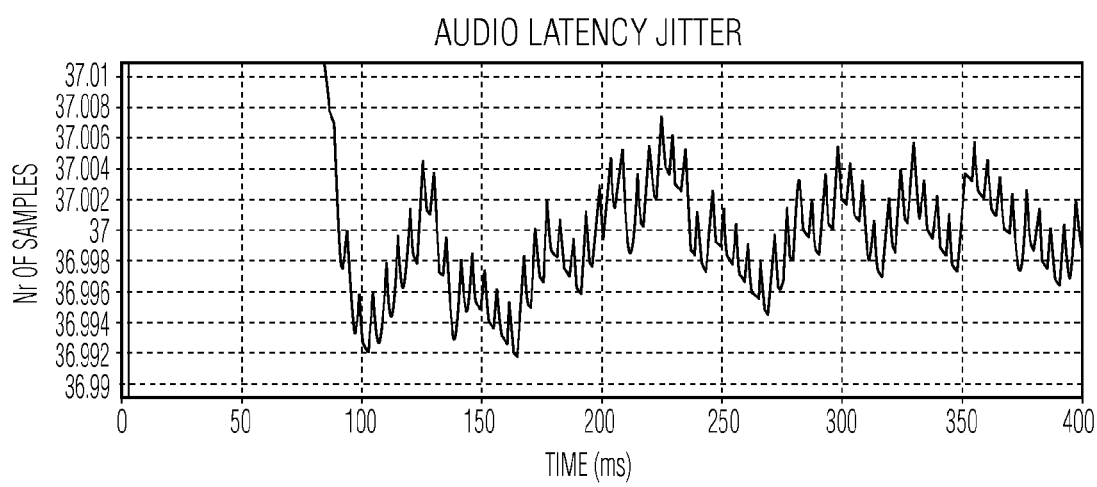

FIG. 5A shows an example of a typical audio latency transient response, expressed as number of audio samples versus time (in ms) according to the present invention, and FIG. 5B shows the Audio Latency Jitter, expressed as fractional number of audio samples versus time (in ms).

The present invention provides at least the following benefits and advantages in that a predictable, fixed end-to-end latency for isochronous data streams can be guaranteed. Known state-of-the-art latency control mechanisms make use of the buffer filling information at the receiver side, and such known mechanisms cannot take into account differences in propagation delay between the transmitter and the different receiving nodes. However, according to the present invention, by including at the transmitter side a timestamp related to a known time reference, the receivers are able to generate a constant end-to-end delay for the isochronous data stream, independent of path delay tolerances.

Moreover, according to the present invention, depending on the required versus available data channel capacity a trade-off can be made between the resolution of time stamp information that is added and the overhead it introduces versus the latency control accuracy and the latency jitter. By encoding the time stamp information as an audio sample count with integer and fractional parts, it becomes very easy to resynchronize the receive buffer pointer when packets are lost during transport in the communication channel. By encoding the time stamp information with a high resolution, the latency control loop can reach the target latency within a fraction of an audio sample period and with a very small residual time jitter.

In addition, the above-described methods according to the present invention can be realized in hardware or as software or computer code that can be stored as machine readable code in a medium such as a ROM, a RAM, a floppy disk, a hard disk, a flash memory, or a magneto-optical disk, or downloaded over a network, so that the methods described herein can be rendered in such software using a general purpose microprocessor, general purpose computer, or a special processor or in programmable or dedicated hardware, such as an ASIC or FPGA.

As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

The present invention has been described with respect to particular embodiments and with reference to certain drawings, but the invention is not limited thereto, but rather, is set forth only by the claims. The drawings described are only schematic and are non-limiting. In the drawings, for illustrative purposes, the size of some of the elements may be exaggerated and not drawn to a particular scale. Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

Furthermore, the terms "first", "second", "third" and the like, if used in the description and in the claims, are provided for distinguishing between similar elements and not necessarily for describing a sequential or chronological order. It is to be understood that the terms so used are interchangeable under appropriate circumstances (unless clearly disclosed otherwise) and that the embodiments of the invention described herein are capable of operation in other sequences and/or arrangements than are described or illustrated herein.

What is claimed is:

1. A communication system with latency control for realizing a controllable end-to-end latency and for reducing time jitter on the end-to-end latency, said system comprising:
   a transmitter including:
   a transmit control unit for generating a time reference TrefTx and a related time synchronization symbol, said transmit control unit taking a snapshot TxScnt of the transmit sample counter at said time reference;
   a transmit time stamp unit for generating transmit time stamp information based on the value TxScnt;
   a transmit unit for transmitting the time reference symbol, the payload data representing the input data samples, and the related time stamp information; and
   a receiver including:
   a time synchronization unit for detecting the transmitted time reference symbol, generating a time reference Tref Rx, which has a fixed and known time relationship with respect to TrefTx, and for providing the time reference Tref Rx to time stamp unit;
   a latency control block for generating an estimate FsTxe of the data sample rate FsTx at the input of the transmitter, based on the received transmitter time stamp, on the receiver time stamp generated by time stamp unit and on a target latency between the transmitter timestamp and the receiver time stamp.

2. The communication system according to claim 1, wherein the transmitter further comprises:
   a data sample counter for counting the input data samples;
   a payload encoder for encoding input data samples into payload data;
   a write control unit for controlling the storage of payload data;
   a transmit buffer for storing the payload data to be transmitted; and
   wherein the receiver further comprises:
   a receive unit for receiving the time reference symbol, the payload data and the related time stamp information from transmit unit;
   a time synchronization unit for detecting the transmitted time reference symbol, generating a time reference Tref Rx, which has a fixed and known time relationship with respect to TrefRx, and for providing the time reference Tref Rx to time stamp unit;
   a receive buffer for storing the received payload data;
   a fractional sample counter for counting the number of data samples provided to the receiver output, based on the estimated sample rate FsTxe of the input data rate FsTx;
   a time stamp unit for generating a receiver time stamp by taking a snapshot RxScnt of sample counter at time instant TrefRx, and providing this time stamp information to latency control block;
   a read control unit for controlling the transfer of payload data from receive buffer to a payload decoder and for transferring the output of payload decoder to the receiver output at the rate determined by sample counter; and
   a payload decoder for converting the payload data from receive buffer to a representation of the data samples provided at the input of the transmitter;
   wherein the block RX DPLL and latency control adjusts the reading moment and position from the RX buffer so that the delay between the time stamp taken at the source side by the transmitter time stamp unit, and the time stamp taken at the receiver side by receiver time stamp unit is constant and equal to a given value.

3. The system according to claim 2, wherein the data samples comprise audio data samples, and wherein when the payload encoder arranges two audio samples in one byte, the Asidx increments at half the sample rate, and timestamp TxScnt is divided into different parts according to the following equation:

TxScnt=2*(Asidx+Nab)+TimeOffset+Nenc.

4. The system according to claim 3, wherein the timestamp information comprises an integer part representing a number of audio samples received so far, and a fractional part representing a fraction of the audio samples that has already entered the transmitter or left a receiver when the time stamp is taken.

5. The system according to claim 3, wherein the data frames comprise a superframe, wherein a start of said superframe is indicated by a beacon frame, and wherein a first channel is the beacon channel, and a first audio channel a1 is allocated to a second channel and an audio channel a2 is allocated to a third channel.

6. The system according to claim 5, where the superframe is transmitted via Time Division Multiple Access (TDMA), and wherein a number of audio samples to be transmitted in allocated time slots is optionally variable.

7. The system of claim 3, wherein the sample counter counts a bit clock of a serial audio interface.

8. A receiver for a latency control system, comprising:
a receiver comprising:
a receive unit for receiving a time reference symbol, a payload data and a related time stamp information from a transmit unit;
a time synchronization unit for detecting the transmitted time reference symbol, generating a time reference Tref Rx, which has a fixed and known time relationship with respect to TrefTx, and for providing the time reference Tref Rx to time stamp unit;
a receive buffer for storing the received payload data;
a latency control block for generating an estimate FsTxe of a data sample rate FsTx at the input of the transmitter, based on the received transmitter time stamp, on the receiver time stamp generated by time stamp unit and on a target latency between the transmitter timestamp and the receiver time stamp;
a fractional sample counter for counting the number of data samples provided to the receiver output, based on the estimated sample rate FsTxe of the input data rate FsTx;
a time stamp unit for generating a receiver time stamp by taking a snapshot RxScnt of sample counter at a time instant TrefRx, and providing this time stamp information to latency control block;
a read control unit for controlling the transfer of payload data from receive buffer to a payload decoder and for transferring the output of payload decoder to the receiver output at the rate determined by sample counter;
a payload decoder for converting the payload data from receive buffer to a representation of the data samples provided at the input of the transmitter;
wherein the block RX DPLL and latency control 315 adjusts the reading moment and position from the RX buffer so that the delay between the time stamp taken at the source side by the transmitter time stamp unit and the time stamp taken at the receiver side by receiver time stamp unit is constant and equal to a given value.

9. The receiver according to claim 8, further comprising: a sample rate converter arranged between the payload decoder and the digital audio output in a case where the audio output sample rate at the receiver side is imposed by an application.

10. The receiver according to claim 8, wherein transmit (TX) control parameters for a sample index Asidx of a first byte to be transmitted and a number of bytes (Nab) to be transmitted are used to write the received audio data bytes in the RX buffer at a location that is synchronized with their location in a transmit TX buffer.

11. The receiver according to claim 10, wherein Asidx, Nab, TimeOffset and a delay of N encoded (Nenc) are used to calculate the timestamp TxScnt at a transmitter side by the following equation:

TxScnt=2*(Asidx+Nab)+TimeOffset+Nenc.

12. The receiver according to claim 11, wherein the RX DPLL generates an estimate source sample FsTxe of the audio sample rate at the transmitter side from its local reference clock for driving the RX sample counter to counts the number of samples coming out of the payload decoder.

13. The receiver according to claim 12, wherein at the time instant TrefRx, which is determined by a correlation peak of the frame world synch, a snapshot of the sample counter RxScnt is taken, and wherein a time difference between TrefRx and TreTx is assumed to be constant.

14. The receiver according to claim 13, wherein the time difference is either known by design or is determined when the channel for the audio stream is created by measuring the path delay, and is expressed as a fractional audio sample count, by the following equation:

DeltaTref=$FsTx$*(Tref$Rx$-$Trx$).

15. The receiver according to claim 14, wherein the audio latency, expressed as a (fractional) number of audio samples, is given by the following equation:

Latency+$TxScnt$+Delta Tref-$RxScnt$, wherein the estimated audio sample rate FsTxe is adjusted such that the latency, calculated according to the audio latency equation, becomes equal to a TargetLatency for that particular channel.

16. A transmitter for a communication system with latency control for realizing a controllable end-to-end latency and for reducing time jitter on the end-to-end latency, said transmitter comprising:
a data sample counter for counting the input data samples;
a payload encoder for encoding input data samples into payload data;
a write control unit for controlling the storage of payload data;
a transmit buffer for storing the payload data to be transmitted;
a transmit control unit for generating a time reference TrefTx and a related time synchronization symbol, said transmit control unit taking a snapshot TxScnt of the transmit sample counter at said time reference;
a transmit time stamp unit for generating transmit time stamp information based on the value TxScnt; and
a transmit unit for transmitting the time reference symbol, the payload data representing the input data samples, and the related time stamp information;
wherein an input data rate is asynchronous with respect to a channel rate, and the input data is not sample rate converted, resulting in a variable payload per frame, and
wherein the time stamp assigned to an input data stream is related to a synchronization symbol that is transmitted.

17. A method for providing end-to-end latency control, comprising:
counting by a transmit sample counter a quantity of input data samples;

encoding by a payload encoder the input data samples;

controlling by a write control unit the encoded data samples and introducing a delay of N encoded (Nenc);

storing by a transmit buffer the encoded samples;

receiving by a transmit control unit a start of a frame synch word (TreTx), a snapshot (TxScnt) of the transmit sample counter, and for receiving a sample index (Asidx) of a first byte to be transmitted and a number of bytes (Nab) to be transmitted;

providing by a transmitter time stamp unit a transmitter time stamp offset (TimeOffset) into frames of a data stream for a particular path followed by predetermined frames of the data stream;

wherein values of Asidx, Nab and TimeOffset are transmitted as time stamp information control parameters together with the encoded data.

18. The method according to claim 17, wherein the data samples comprise audio data samples, and wherein when the payload encoder arranges two audio samples in one byte, the Asidx increments at half the sample rate, and timestamp TxScnt is divided into different parts according to the following equation:

$$TxScnt = 2*(Asidx+Nab)+TimeOffset+Nenc \quad (eqn.\ 4.1).$$

19. The method according to claim 18, wherein the timestamp information comprises an integer part representing a number of audio samples received so far, and a fractional part representing a fraction of the audio samples that has already entered the transmitter or left a receiver when the time stamp is taken.

20. The method according to claim 19, wherein the data frames comprise a superframe, wherein a start of said superframe is indicated by a beacon frame, and wherein a first channel is the beacon channel, and a first audio channel a1 is allocated to a second channel and an audio channel a2 is allocated to a third channel.

21. The method according to claim 19, further comprising:

storing by a receive (RX) buffer received data samples transmitted with control parameter information;

estimating by a block latency control and receive digital phased locked loop (RX DPLL) the audio data sample rate (FsTxe) seen at the input of the transmitter, said RX DPLL generating an estimated value FsTxe of the audio sample rate FsTx at the source side;

reading compressed data by a payload decoder from the RX buffer and providing decoded audio samples at the estimated source sample FsTxe;

sampling a fractional sample counter output by payload decoder at time instant TrefRx, which has a fixed and known time relationship with respect to TreTx; and adjusting by the block RX DPLL and latency control the reading from the RX buffer so that the delay between the time stamp taken at the source side by the transmitter time stamp unit, and the time stamp taken at the receiver side by receiver time stamp unit 310 is constant and equal to a given value.

22. The method according to claim 21, wherein the RX DPLL generates an estimate source sample FsTxe of the audio sample rate at the transmitter side from its local reference clock for driving the RX sample counter to count the number of samples coming out of the payload decoder.

23. The receiver according to claim 22, wherein at the time instant TrefRx, which is determined by a correlation peak of the frame world synch, a snapshot of the sample counter RxScnt is taken, and wherein a time difference between TrefRx and TreTx is assumed to be constant.

24. The receiver according to claim 23, wherein the time difference is either known by design or determined when the channel for the audio stream is created by measuring the path delay, and is expressed as a fractional audio sample count, by the following equation:

$$DeltaTref = FsTx*(TrefRx - Trx).$$

25. The receiver according to claim 24, wherein the audio latency, expressed as a (fractional) number of audio samples, is given by the following equation:

$$Latency + TxScnt + Delta\ Tref - RxScnt,$$

wherein the estimated audio sample rate FsTxe is adjusted such that the latency, calculated according to the audio latency equation, becomes equal to a TargetLatency for that particular channel.

* * * * *